Figure 1:
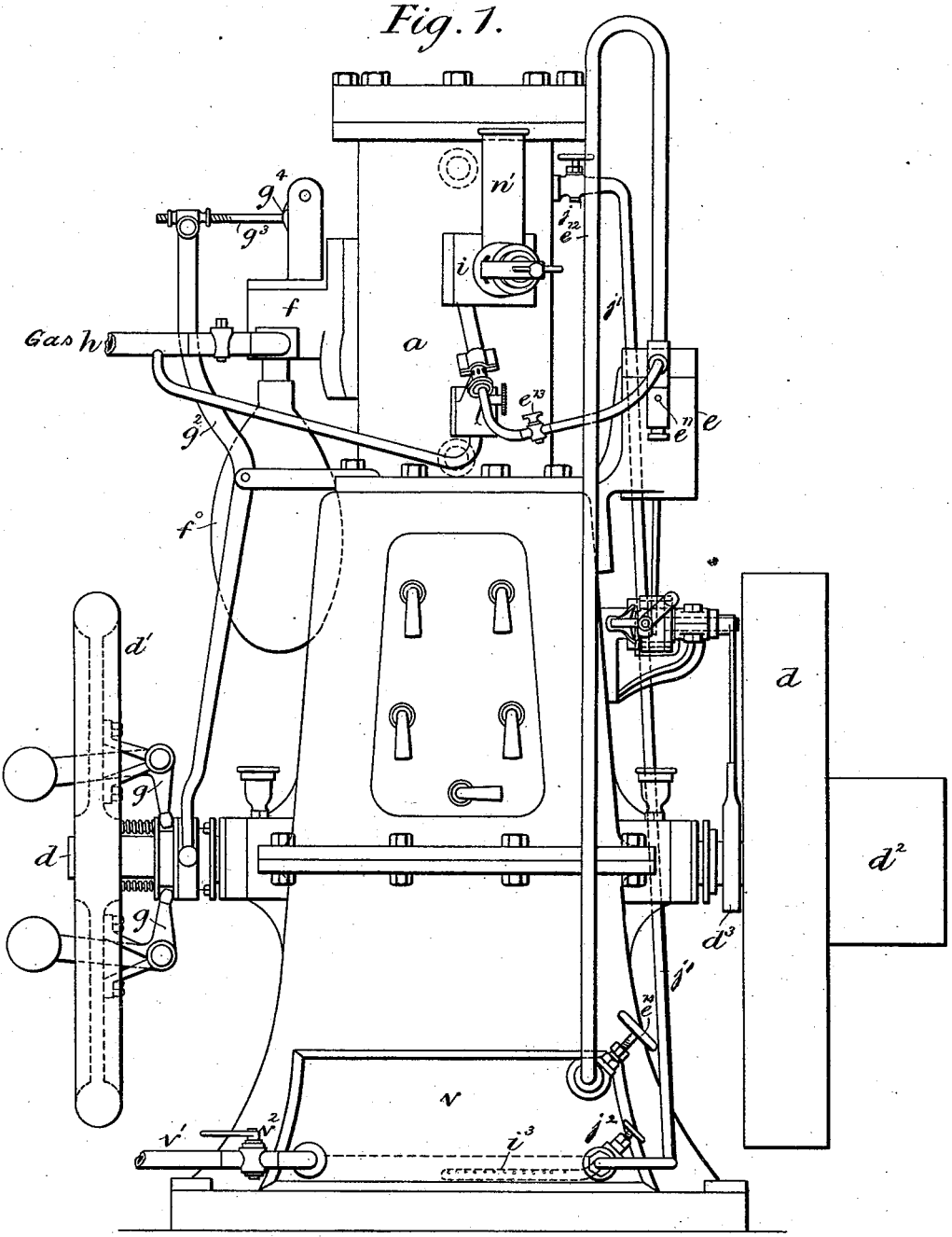

(No Model.) 9 Sheets—Sheet 1.

H. T. DAWSON.
GAS ENGINE.

No. 466,331. Patented Jan. 5, 1892.

Witnesses
B. W. Miller
Baltus De Long

Inventor
Henry Thomas Dawson
By his Atty's.
Baldwin Davidson & Wight (No Model.) 9 Sheets—Sheet 2.

H. T. DAWSON.
GAS ENGINE.

No. 466,331. Patented Jan. 5, 1892.

Witnesses
B. W. Miller
Baltus De Long

Inventor
Henry Thomas Dawson.
By his Attys.
Baldwin Davidson & Wight (No Model.) 9 Sheets—Sheet 3.

H. T. DAWSON.
GAS ENGINE.

No. 466,331. Patented Jan. 5, 1892.

Witnesses:
B. W. Miller
Baltus De Loey

Inventor:
Henry Thomas Dawson
By his Att'ys
Baldwin Davidson & Wight (No Model.) 9 Sheets—Sheet 4.

H. T. DAWSON.
GAS ENGINE.

No. 466,331. Patented Jan. 5, 1892.

Witnesses
B. W. Miller.
Baltus De Long.

Inventor:
Henry Thomas Dawson.
By his Attys.
Baldwin Davidson & Wight

THE NORRIS PETERS CO., PHOTO-LITHO., WASHINGTON, D. C.

(No Model.) 9 Sheets—Sheet 5.
H. T. DAWSON.
GAS ENGINE.
No. 466,331. Patented Jan. 5, 1892.
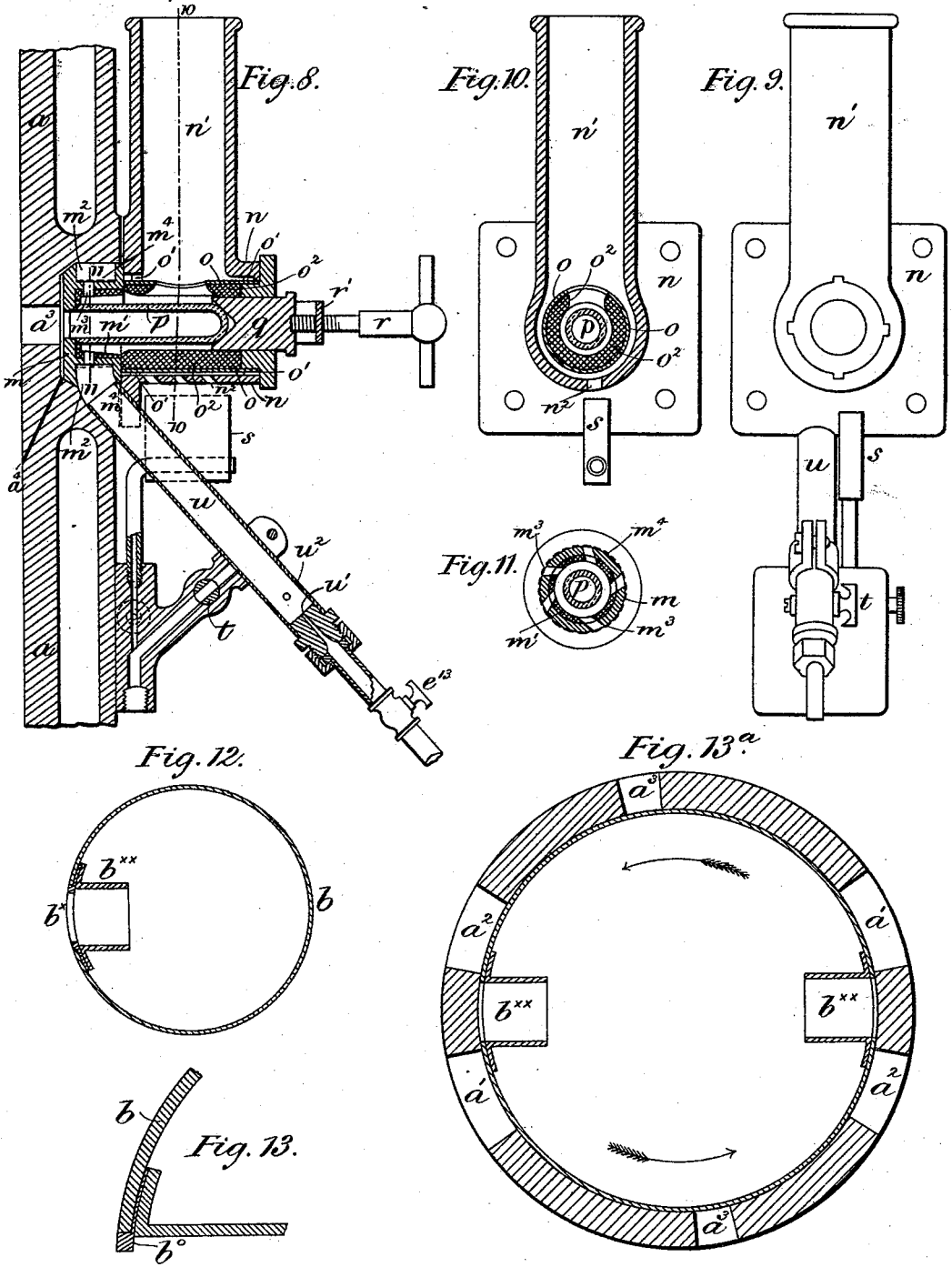
Witnesses
B. W. Miller
Baltus D. Long
Inventor
Henry Thomas Dawson
By his Attys.
Baldwin Davidson & Wright

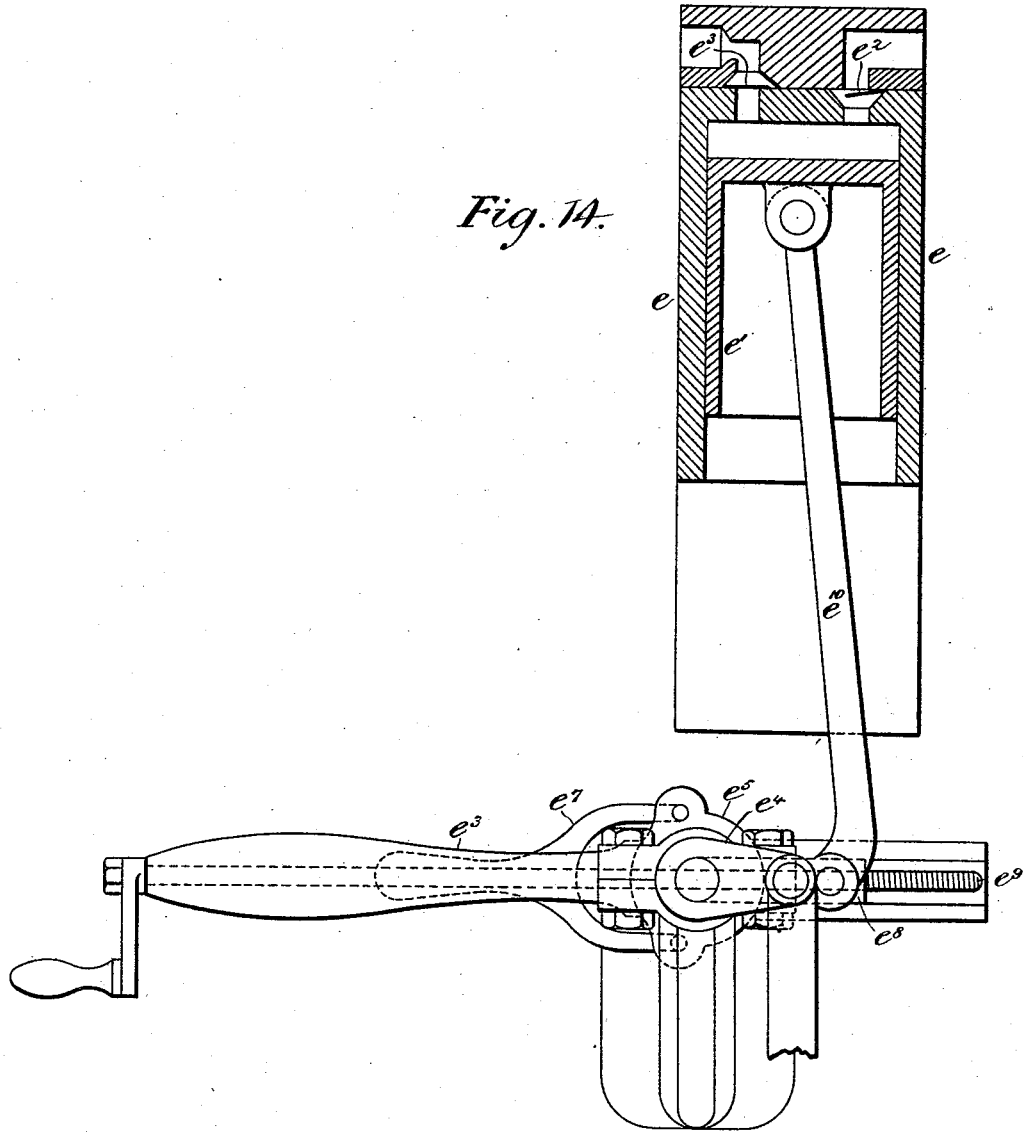

(No Model.) 9 Sheets—Sheet 7.
H. T. DAWSON.
GAS ENGINE.
No. 466,331. Patented Jan. 5, 1892.
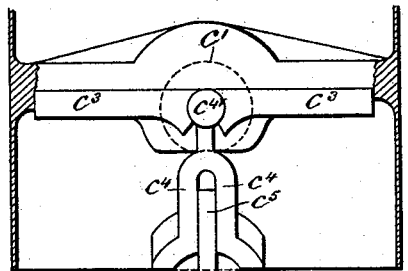
Fig. 15.
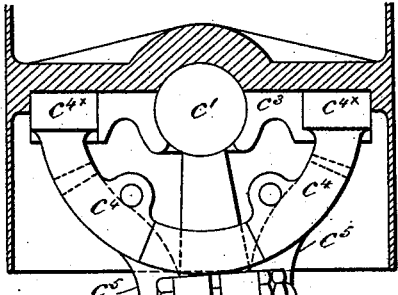
Fig. 15.ˣ
Fig. 17.
Fig. 16.
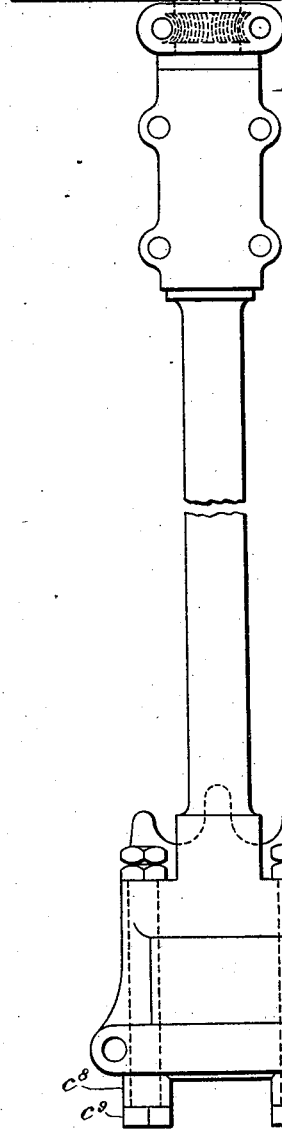
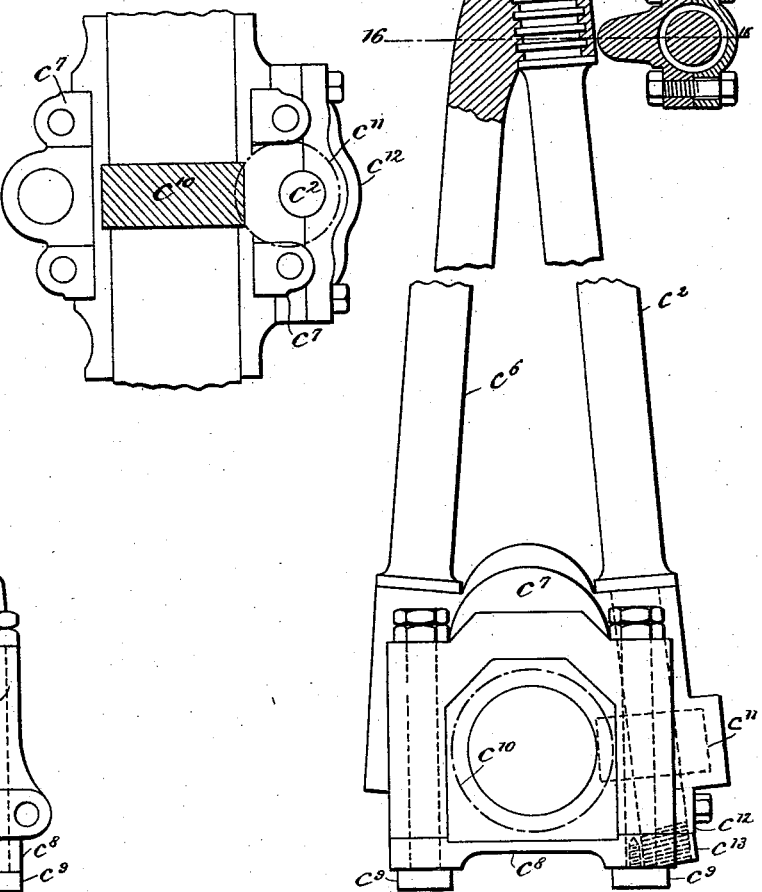
Witnesses
B. W. Miller
Baltus D. Long
Inventor:
Henry Thomas Dawson
By his Att'ys
Baldwin Davidson & Wight (No Model.) 9 Sheets—Sheet 8.
H. T. DAWSON.
GAS ENGINE.
No. 466,331. Patented Jan. 5, 1892.
*Fig. 18.*
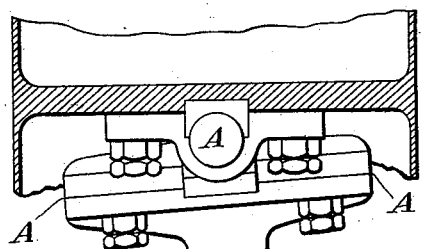
*Fig. 19.*
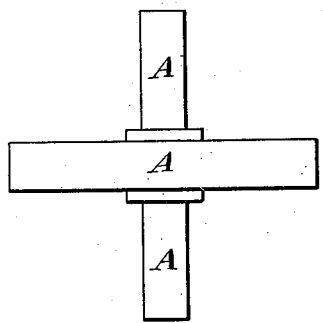
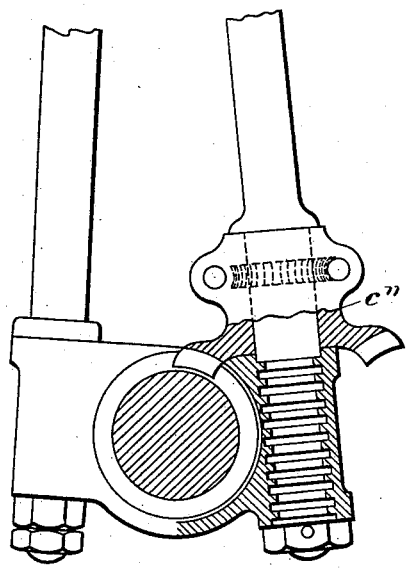
Witnesses
B. W. Miller
Baltus DeLong
Inventor,
Henry Thomas Dawson,
By his Atty's.
Baldwin Davidson & Wight (No Model.) 9 Sheets—Sheet 9.
H. T. DAWSON.
GAS ENGINE.
No. 466,331. Patented Jan. 5, 1892.
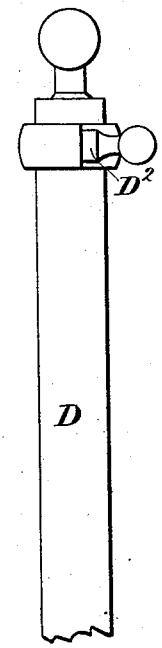
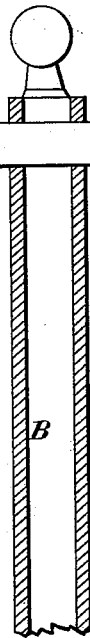
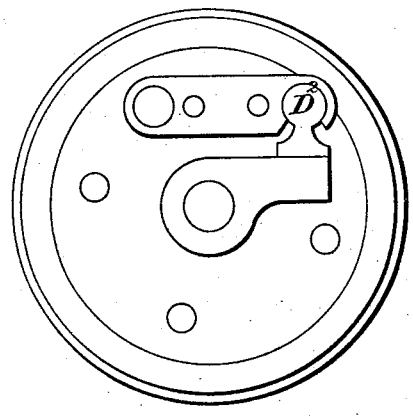
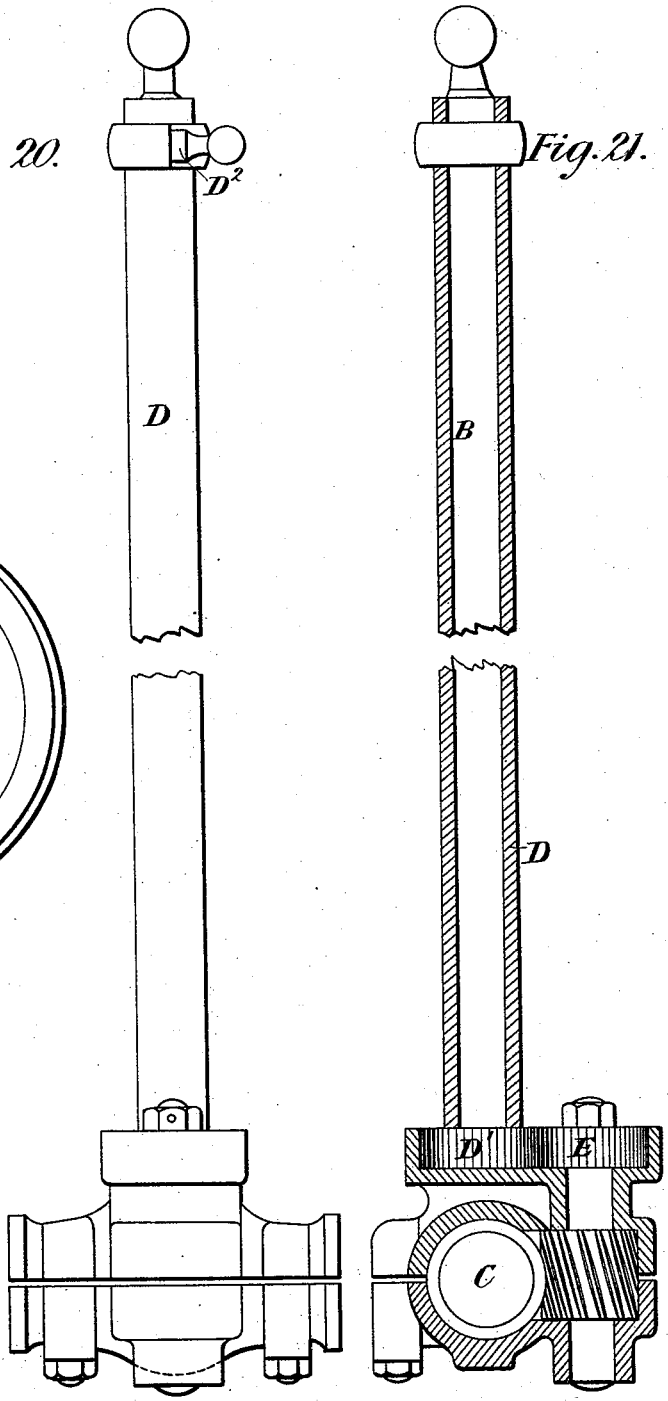
Fig. 20. Fig. 21. Fig. 22.
Witnesses
B. W. Miller
Baltus D. Long
Inventor:
Henry Thomas Dawson,
By his Attys.
Baldwin Davidson & Wight

UNITED STATES PATENT OFFICE.

HENRY THOMAS DAWSON, OF SALCOMBE, ENGLAND.

GAS-ENGINE.

SPECIFICATION forming part of Letters Patent No. 466,331, dated January 5, 1892.

Application filed May 19, 1891. Serial No. 393,284. (No model.)

*To all whom it may concern:*

Be it known that I, HENRY THOMAS DAWSON, gentleman, a subject of the Queen of Great Britain, residing at Salcombe, in the county of Devon, England, have invented certain new and useful Improvements in Gas-Engines, of which the following is a specification.

This invention has for its object improvements in gas-engines. The improved engine, which is suitable for high speeds, has four stages in its cycle of action—that is to say, first, the cylinder takes its charge during the outward movement of the piston; second, the charge is compressed by the return of the piston; third, the charge is fired and the effective outward movement of the piston takes place, and, fourth, the products of combustion are discharged while the piston returns. This cycle is attained in my gas-engine without the use of valves or slides, the piston itself operating as valves, and, besides reciprocating, it entirely revolves once for each cycle of the engine.

An engine constructed in accordance with my invention is shown by the annexed drawings.

Figure 2:
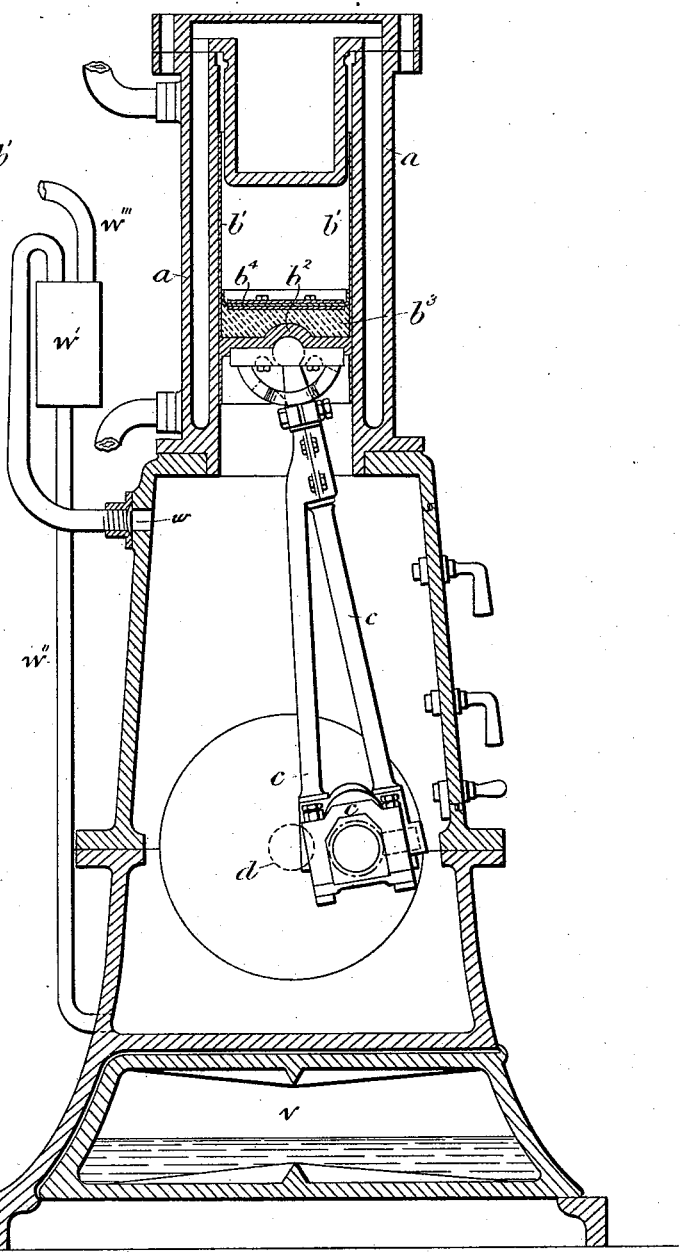
Figure 4:
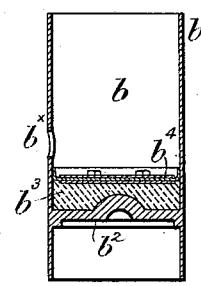
Figure 3:
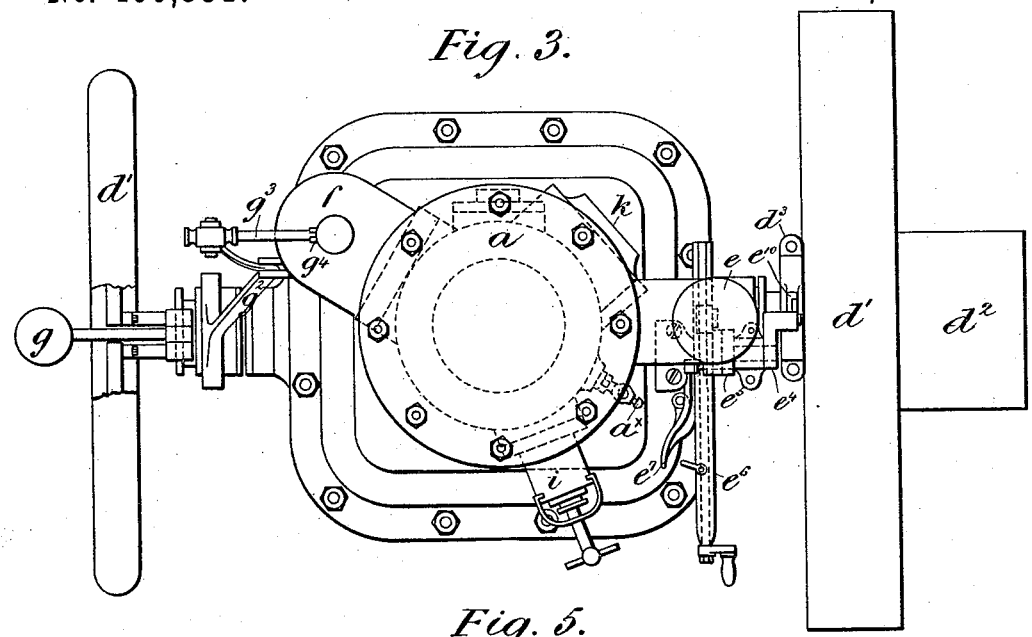
Figure 5:
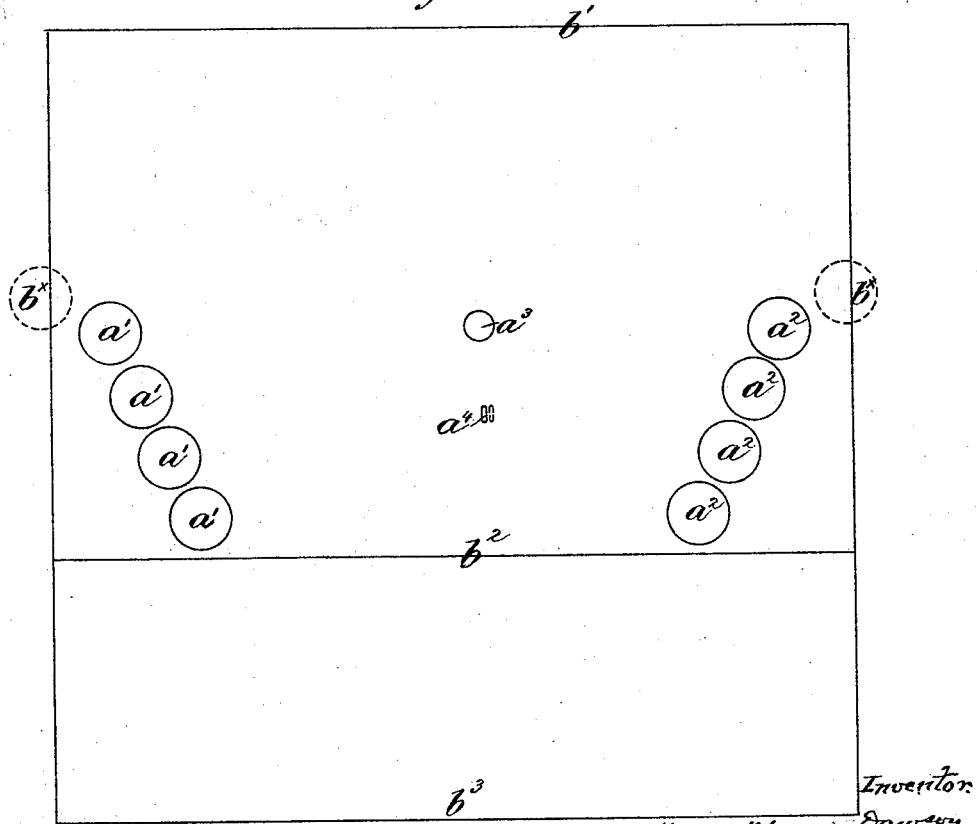
Figure 7:
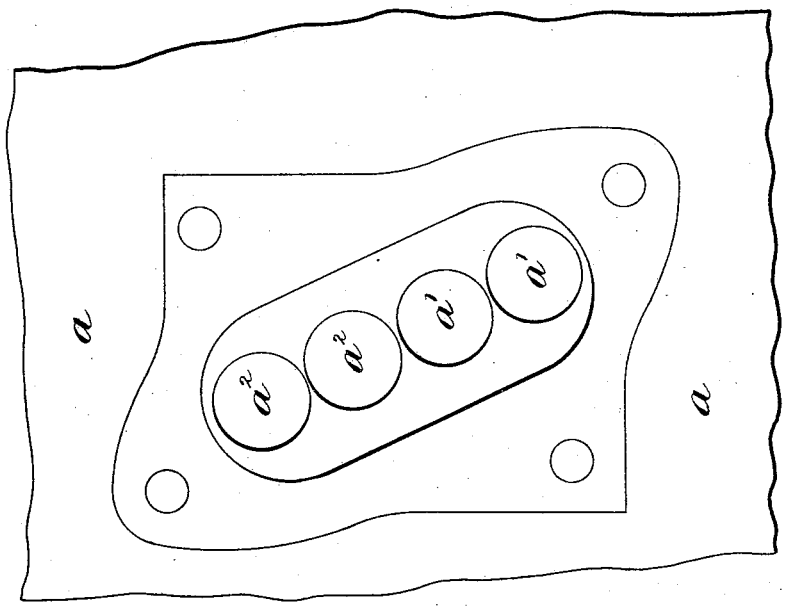
Figure 6:
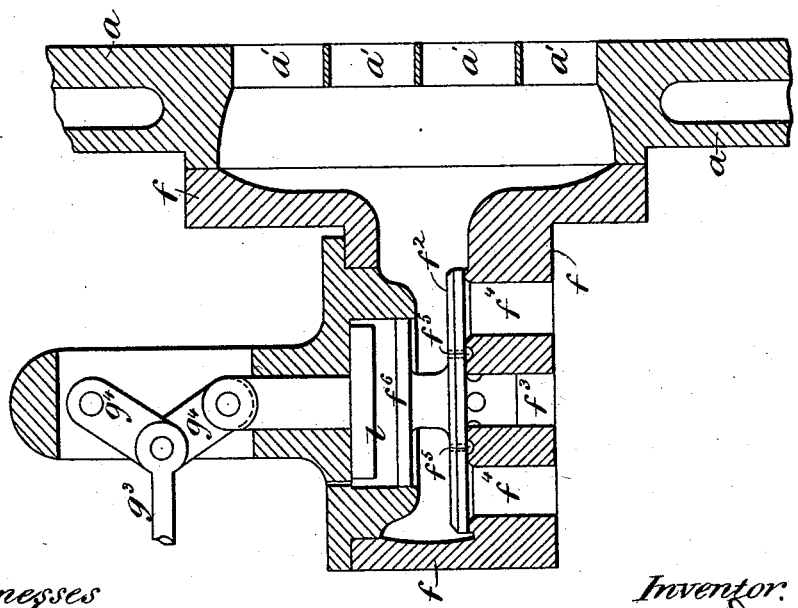

Figure 1 is a front elevation. Fig. 2 is a vertical section, and Fig. 3 is a plan. Figs. 4 to 22 are in most instances on an enlarged scale. Fig. 4 is a longitudinal section of the piston. Fig. 5 shows the interior of the cylinder developed. Fig. 6 is a detail view of the gas and air valve. Fig. 7 is a detail view of a portion of the cylinder and its ports. Figs. 8, 9, 10, and 11 are detail views of the ignition apparatus. Figs. 12, 13, and 13$^a$ are detail views showing modifications of the piston. Fig. 14 shows a section of the air-pump. Figs. 15, 15$^\times$, 16, and 17 are views of the connecting-rod to which the piston is attached. Figs. 18 and 19 are views of a modified form of connecting-rod. Figs. 20, 21, and 22 are views of another form of connecting-rod.

In Figs. 1 to 3, $a$ is the cylinder. It is water-jacketed to keep it cool. The cylinder contains a piston $b$, which, by a connecting-rod $c$, drives a crank on an axis $d$.

$d'$ $d'$ are fly-wheels, and $d^2$ is a belt-pulley. $d^3$ is an eccentric on the axis actuating an air-pump $e$. The purpose served by this air-pump is hereinafter explained.

$f$ is a casing containing a valve which opens for the admission of air and gas to the cylinder.

$f°$ is an elastic bag serving to maintain a uniform gas-pressure.

$g$ is a governor controlling the gas and air supply.

$h$ is the gas-supply pipe.

$i$ is the ignition apparatus.

$k$ is the exhaust or outlet from the cylinder.

$a^\times$ is a cock, which may be opened to reduce the compression in the cylinder at starting.

The crank and connecting-rod are inclosed in a chamber, and a lubrication is effected by oil or lubricant being placed in the crank-chamber and distributed to the main working parts by the motion of the crank. The piston is tubular and of about twice the length of the stroke. It fits well to the cylinder in which it works. The piston-tube $b'$ is closed by a diaphragm $b^2$, situate at about the fourth of its length from the outer end of the tube. The inner face of the piston-diaphragm $b^2$ is covered with asbestus or other non-conducting material $b^3$, which may be firmly secured by means of a thin sheet-metal cup and protecting-plates $b^4$, fastened by bolts. This covering protects the piston-diaphragm from the burning charges. The cylinder is about thrice as long as the stroke. It has long ports about its center part. These ports extend spirally in the cylinder-walls for about the length of the stroke, or rather less.

Fig. 5 shows to a larger scale the interior of the cylinder developed. The full circles show the ports or passages formed in it. The ports $a'$ $a'$ $a'$ $a'$ in this figure serve for the admission of air and gas. They all communicate with a passage formed partly in the walls of the cylinder and partly by the port-cover and form one elongated port, as seen in Figs. 6 and 7. They also communicate with the valve by which the admission is controlled.

$a^2$ $a^2$ $a^2$ $a^2$ in Fig. 5 are the exhaust-passages. They also all communicate with a passage formed partly in the cylinder-walls and partly in the port-cover and operate as one passage obliquely cut through the cylinder.

$a^3$ is the firing-port.

$a^4$ is a small aperture, the purpose of which is described farther on.

The piston has an aperture or port through its tubular part, about the center of its length, serving for all the purposes of admission, ignition, and exhaust. This aperture is shown in Fig. 4, and also in Fig. 5, in dotted lines. It is marked $b^{\times}$. The aperture $b^{\times}$ is carried by the movement of the piston successively over the several ports in the cylinder. In Fig. 5 it is shown in the position it occupies when the piston is at the inner end of its stroke and the engine is at the commencement of the cycle.

The lines $b'\ b^2$ in Fig. 5 represent the positions of the ends of the piston-tube when the piston is at the inner end of its stroke. The distance between the lines $b^2$ and $b^3$ represent the length of the stroke. In the downward or out stroke the piston-port $b^{\times}$ passes in succession over the cylinder-ports $a'\ a'\ a'\ a'$, and during this time the charge is taken into the cylinder through the governor-valve. Throughout the whole of the next instroke of the piston the port $b^{\times}$ is closed. It does not pass over any of the ports in the cylinder, and the charge is compressed. At the commencement of the following outstroke the piston-port $b^{\times}$ passes by the cylinder-port $a^3$, and the charge is fired. Afterward throughout the outstroke the port $b^{\times}$ is closed until at the turn of the stroke the piston-port $b^{\times}$ comes to communicate with the first of the exhaust-ports $a^2\ a^2\ a^2\ a^2$, and it remains open to these ports throughout the instroke and until the end of the cycle.

The cover or upper end of the cylinder $a$ is made to extend into the tubular piston, as is seen in Fig. 2, so as to leave only a proper space for compressing the charge. The cover contains water, and water-passages are formed upon the cylinder, the whole being in connection with a cistern. The water is admitted from the cistern at the bottom of the jacket and flows out at the top to return to the cistern, and so a continuous circulation is maintained.

In order to govern the speed of the engine, a gas and air valve (shown in Fig. 6) is fitted upon the cylinder outside the admission-ports $a'\ a'$.

$f$ is the valve-casing.

$f^2$ is the valve. When down, it closes both the gas-inlet at $f^3$ and the air-inlets at $f^4$. The suction of the piston lifts the valve and then air and gas both enter the cylinder, some of the gas passing from the annular groove $f^5$ through perforations in the valve.

$f^6$ is a guiding-head fixed on the valve. Thus the valve closes both gas and air passages at once, and the valve is so constructed by proportioning the aforesaid passages as to pass nearly constant proportions of gas and air at the different lifts allowed to the valve.

The governor $g$ limits or prevents the rise of the valve when the engine attains its proper speed. The control of the governor over the gas and air valve is obtained by moving a stop $l$ over the head of the said valve, so as to limit or stop its rise. The divergence of the governor-weights acts through the lever $g^2$, rod $g^3$, and toggle-links $g^4$ to lower the stop, and finally it holds the valve upon its seat. In some cases I so construct the valve that it still admits some air when the gas-passage is closed. This serves to reduce the vacuum in the cylinder and is effected by making the valve-disk covering the air-ports of thin metal, leather, or other flexible material.

Ignition is given by means of apparatus shown by Figs. 8, 9, 10, and 11. Fig. 8 is a vertical section through the cylinder-wall and the ignition apparatus, and Fig. 9 is an elevation. Fig. 10 is a section on the line 10 10 in Fig. 8, and Fig. 11 is a section on the line 11 11 in Fig. 8.

In the cylinder-wall around the port $a^3$ a recess is formed, and into this the hollow reel-shaped plug $m$ is fitted. It is provided with a refractory lining $m'$. The plug is so formed as to leave a sealed cavity $m^2$ between it and the cylinder-wall, and to this cavity an inflammable mixture of gas and air is supplied.

$m^3\ m^3$ are perforations in the sides of the reel-shaped plug, through which the gas and air pass to be burned in the furnace-chamber within it.

$m^4$ is wire-gauze surrounding the plug to prevent the flame from passing out through the perforations to the inflammable gaseous mixture in the cavity $m^2$. The furnace-chamber is formed partly within the plug $m$ and partly within a casting $n$, bolted to the side of the cylinder. A chimney $n'$ forms part of this casting. The casting $n$ when fixed in place forms a tight joint with the outer end of the plug $m$. It also receives into it a metal lining $o$, which is inserted from the open end, and then by a partial turn is locked, projections $o'$ upon it engaging with bayonet-grooves in the mouth of the part $n$. The lining $o$ is itself provided with a refractory lining at $o^2$.

$p$ is a metal, porcelain, or other refractory capsule. At its inner end it enters a seat of suitable form provided for it in the plug $m$, and the two parts fit together to form a tight joint. At its outer end the ignition tube or capsule is pressed upon to hold it in its seat by the metal block $q$, which closes the end of the lining-piece $o$.

$r$ is a hand-screw. It works through a threaded hole in the spring bridge-piece $r'$. The ends of the bridge-piece $r'$ are so made that they clip upon the outside of the ignition apparatus $i$, and the end of the screw bears upon the block $q$ and presses it forward. In this manner the ignition tube or capsule is held to its seat by an elastic pressure, which admits of the free expansion of the tube. Thus it will be seen that the furnace-chamber can be readily opened when required.

$s$ is a Bunsen burner arranged beneath the furnace-chamber, by which I may heat it gradually before starting the engine. The flame from the burner ascends through apertures $u^2$ in the casting $n$, and so to the chimney.

The heating of the furnace-chamber and the capsule when at work is performed by the combustion of gas, which enters by a regulating-cock at $t$. It enters a tube $u$ and is urged forward by an air-blast admitted through the small nozzle-piece $u'$. The blast induces more air to enter by the holes $u^2\ u^2$. The gas and air mixed together pass on into the cavity $m^2$, thence through the wire-gauze at $m^4$ and the passages $m^3$, and into the furnace-chamber, where they burn. The ignitor is started by holding a light at the top of the chimney.

This improved construction and arrangement of igniting apparatus insure certainty of ignition. This results from placing the open end of the capsule near to the charge to be fired. The blast keeps the capsule in a state of incandescence and causes a great intensity and rapidity of ignition necessary for high speeds.

In order to render the ignition more certain, I adapt a short tube $b^{\times\times}$ to the port $b^\times$ within the piston, as is shown in section at Fig. 12. Through this tube the cylinder receives its charge. The tube retains a portion of the incoming charge practically free from products of combustion, some of which remains in the cylinder from the previous stroke. The pure explosive mixture contained in the tube $b^{\times\times}$ is carried by the piston to the ignition-port. The charge being then under pressure, this pure gaseous mixture enters the ignition-port $a^3$, driving before it any products of combustion which may be contained therein. It is to admit of the ignition-port being thus blown through that the previously-mentioned passage $a^4$ is provided. This passage communicates with the ignition port by a space beneath the reel-shaped plug $m$. Immediately before firing the passage $a^4$ is open. A perforation in the piston-tube leading outside its diaphragm, then coming to coincide with it, a slight escape of the gaseous mixture takes place, which clears the ignition-port of foul gases. The combustible charge then comes in contact with the interior surface of the incandescent capsule and is ignited thereby.

The crank-chamber into which the passage $a^4$ opens through the piston is ventilated by a pipe fitted with a light valve $w$ opening outward, Fig. 2, which pipe leads into a closed receptacle $w'$, where any escaping lubricant is separated and is returned by the pipe $w''$ to the crank-chamber. The separated gases are led away by the pipe $w'''$ to the exhaust or other outlet.

I sometimes provide a packing-ring upon the piston around the port, and this when internal pressure is present makes a gas-tight joint against the walls of the cylinder. This packing-ring is seen in Fig. 12, and a portion of it is drawn to a larger scale at Fig. 13. It is marked $b°$. I have spoken hitherto of but one port $b^\times$ in the piston; but often and especially in engines of considerable size I provide two sets of piston and vent ports diametrically opposite. I then rotate the piston once only during four rotations of the crank. Sometimes where the size of the engine is such as to render it expedient I also provide the cylinder with a complete additional set of ports diametrically opposite the first set, thus increasing the facility of admission, ignition, and exhaustion. This arrangement is illustrated by the diagram, Fig. 13$^a$.

The air-pump $e$, which supplies the jet of air for forcing the furnace, is shown in section at Fig. 14.

$e'$ is a reciprocating plunger in the cylinder $e$.

$e^2$ is the inlet-valve, and $e^3$ is the outlet. This air-pump is worked by the engine from an eccentric acting on an arm $e^4$. This arm is upon an axis carried by a bracket on the frame, and upon the same axis there is a disk $e^5$. Upon another axis in line with the first there is a lever $e^6$. The lever $e^6$ carries upon it a bolt-lever $e^7$, having two bolts which shoot through the lever $e^6$ into holes in the disk $e^5$. When thus bolted, the eccentric gives motion to the lever $e^6$ so long as the engine runs. The bolt-lever $e^7$ can, however, be latched back, and the pump can then be worked by hand.

A block $e^8$ is arranged to slide upon the lever $e^6$. It works as a nut on a screw $e^9$, which the lever $e^6$ also carries. $e^{10}$ is a connecting-rod jointed at one end to the plunger $e'$ and at the other to a pin or stud on the block $e^8$. This arrangement admits of the stroke of the air-pump being varied at will. The air delivered from the air-pump by the valve $e^3$ is led by a pipe to the nozzle $u'$. A spring-loaded valve, fitted at $e^{11}$, allows air to escape when the standard pressure is reached.

My improvements being designed for the direct driving of dynamos and other high-speed machinery for which service the highest efficiency of ignition is imperative, I consider it wise to provide, also, the following arrangements, which enable me to start the engine without the use of the air-pump. Another pipe, as shown at $e^{12}$, Fig. 1, connects the air-pump with an air-vessel $v$ in the base of the engine. This vessel is air-tight and connected by a pipe $v'$ with the circulating water-cistern or other water-vessel, so as to give a head of water about five or six feet above the air-vessel $v$, which affords the necessary air-pressure to sustain the furnace-blast. The pressure can be varied by raising or lowering the head of water. The action of the pump forces air into the air-vessel $v$ through the pipe $e^{12}$, and displaces therefrom any water contained therein by forcing it back through pipe $v'$ into the cistern or vessel. The pipe connecting the pump with the blast-jet $u'$ is fitted with a cock $e^{13}$, which may be opened to supply the furnace-blast simultaneously with the charging of the air-vessel $v$, or the cock $e^{13}$ may be closed until the air-vessel $v$ is fully charged, when the cock $e^{14}$ may be closed to retain the stored air for starting the furnace. The furnace may also be started by the direct blast from the pump worked by hand until the engine is put in motion. Then the cock $e^{14}$ may be opened to continue the blast at the standard pressure.

The stroke of the air-pump is adjusted to supply rather more air than necessary to maintain the head of water, and any excess of air delivered by the pump will escape by the pipe $v'$ through the water to the open air at the water-head. Thus uniformity of air-pressure at all speeds of the engine is insured. If the water-head be not available, I close the cock $v^2$, when the vessel $v$ becomes a compressed-air-storage chamber.

In case of failure of the pump-gear I bring into use to sustain the furnace-blast a pressure-supply from the engine-cylinder. For this purpose I provide a pipe with a non-return valve $j$, leading out of the cylinder at a point passed by the end of the piston at about a half of its outward stroke, and a pipe $j'$, leading through a stop-valve $j^2$ into the lower part of the air-reservoir $v$, terminating within the reservoir in a rose or piece of pipe pierced with numerous small holes.

The connecting-rod $c$ is shown to a larger scale by the Figs. 15, $15^\times$, 16, and 17. Fig. 15 is a front elevation, and Fig. $15^\times$ is a side elevation, partly in section. In these figures a part of the piston also is shown. Fig. 16 is a transverse section of the rod on the line 16 16 in Fig. $15^\times$, and Fig. 17 is an under side view with the lower brass of the crank-bearing removed.

$c'$ is a ball at the upper end of the axis $c^2$, which forms a portion of the rod. It is lodged in a corresponding cup or recess in the under side of the piston and retained there by the cheeks $c^3$ $c^3$, which are attached by screws to the piston. The cheek-pieces $c^3$ $c^3$ also form bearings, into which the cylindrical pivots $c^{4\times}$ of the semicircular piece $c^4$ are received, and this piece is thus attached to the piston in such a manner that it can rock about its pivots. The axis $c^2$ passes down through an opening in the piece $c^4$, and it has two horns $c^5$ $c^5$ clipped fast upon it. These horns are received into slots in the piece $c^4$, so that the axis $c^2$ in its rotation is compelled to carry the piston round with it; but nevertheless its connection with the piston does not interfere with its rocking motion.

$c^6$ is the part of the connecting-rod to which the crank-pin bearing is fixed, and in another bearing $c^{6\times}$ upon the same part the axis $c^2$ is held.

$c^7$ is the crank-bearing, and into it upper and lower brasses are fitted. The lower brass is retained in place by the straps $c^8$ and by the bolts $c^9$. The crank-pin has a worm $c^{10}$ upon it, and a cavity to receive this worm is provided in the bearing. The axis $c^2$ passes down through the crank-bearing $c^7$, and it is so fitted that it can rotate therein. It has also upon it the worm-wheel $c^{11}$, which gears into the worm on the crank-pin. The end of the axis $c^2$ is restrained by a strap $c^{12}$. $c^{13}$ is a nut upon the end of the axis beneath the strap.

To facilitate the accurate setting of the clip holding the horns $c^5$, on which setting the position of the piston within the cylinder depends, it is so arranged that the thread of one of the clip-bolts engages with teeth formed on the part $c^2$, and by turning this bolt the horns $c^5$ can be slowly rotated upon $c^2$.

Fig. 18 is a side elevation, partly in section, of another connecting-rod which may be substituted for the preceding. Fig. 19 is a plan of a portion of the same. In this case the piston has a double bearing on its under side, and this holds the two opposite arms or trunnions A A of the cross-piece represented in Fig. 19. There is another bearing at the end of the rotating axis $c^2$ of the connecting-rod. So a universal joint connecting $c^2$ with the piston is formed. The rotary motion may be imparted to the axis $c^2$, as described in reference to the preceding figures, or the form and arrangement of the worm and wheel may be varied, as is represented in these figures.

Another connecting-rod which may be used for rotating the piston at the same time that it transmits the reciprocating motion thereof to the crank is shown by Figs. 20, 21, and 22. Fig. 20 is a side elevation, and Fig. 21 is a longitudinal section. Fig. 22 shows the connection between the rod and the piston. B is the "rod," properly so called. It is connected at one end by a ball-joint to the piston, and on its other end the bearing for the crank-pin C is fixed. Upon the rod B the sleeve D is mounted, so that it can turn freely. It carries at one end the spur-wheel D', and this gears with another wheel E. The axis of the wheel E is mounted in the bearing-block, and it has upon it the worm-wheel F, which is in gear with a worm upon the crank-pin. The sleeve D is thus rotated. $D^2$ is an arm at the other end of the sleeve D. It terminates in a ball forming part of a universal joint, which connects the arm with a short link, and this link at its other end is connected by another universal joint with the piston, as is seen in Fig. 22. Hence the sleeve D as it rotates drags the piston round with it. The same rotation to sleeve D may be effected by substituting bevel-wheels fitted to the sleeve and crank-pin in place of the spur-wheels, worm-wheel, and worm-gear.

Having now particularly described and ascertained the nature of my said invention and in what manner the same is to be performed, I declare that what I claim is—

1. In a gas-engine, the combination of a cylinder, a piston, means for reciprocating and continuously rotating the piston, ignition apparatus, and entrance and exhaust ports controlled by the piston, whereby by the action of the piston first a charge of gas and air is admitted to the cylinder, then by the return of the piston the charge is compressed, afterward at the commencement of the next stroke the compressed charge is fired, and when the piston again returns the products of combustion are expelled from the cylinder, substantially as described.

2. In a gas-engine, the combination of a cylinder, ignition apparatus and port, and a piston controlling the ignition-port and geared with the crank-pin, and thus rotated continuously in one direction, and an admission-port controlled by the piston, substantially as described.

3. In a gas-engine, the combination of a piston, means for reciprocating it and for rotating it continuously, and a cylinder having spirally-arranged admission and exhaust ports coinciding with the track of a port or ports in the piston, whereby as the piston moves the admission and exhaust of gas are controlled, substantially as described.

4. In a gas-engine, the combination of a piston, means for reciprocating it and for rotating it continuously, a cylinder having spirally-arranged admission and exhaust ports coinciding with the track of a port or ports in the piston, a gas and air inlet valve, and a governor controlling the valve and operating to close or partially close the valve, whereby the quantity of the charge is varied, while the proportions of gas and air remain approximately constant, substantially as described.

5. In a gas-engine, the combination, substantially as described, of a cylinder with an ignition-port $a^3$, a heated capsule $p$ beyond the ignition-port, a passage $a^4$, leading back into the cylinder from the outer side of the ignition-port, a piston reciprocating within the cylinder and having a piston-tube $b'$ with an aperture $b^\times$, which when brought by the movement of the piston to coincide with the ignition-port permits of the escape of a portion of the charge outward past the piston through the port $a^3$ and the passage $a^4$.

6. In a gas-engine, the combination, substantially as described, of a cylinder, an admission-port and an ignition-port in the walls of the cylinder, a rotating piston with a piston-tube $b'$, and an internally-projecting tube $b^{\times\times}$ upon the piston-tube, through which the charge is admitted when the tube $b^{\times\times}$ is brought to coincide with the admission-port, and from which a portion of the charge passes out into the ignition-port when the tube $b^{\times\times}$ is brought to coincide therewith.

7. In a gas-engine, the combination of a tube or capsule for igniting the charge and a spring for holding the tube in position with its open end fitting air-tight in a seat at the ignition-port, whereby the tube or capsule is allowed to expand and contract and may be heated close up to the point of contact with its seat at the ignition-port, substantially as described.

8. In a gas-engine, the combination of an ignition apparatus, an air-pump, connections between the air-pump and the ignition apparatus, an air-storage vessel connected with the air-pump, and a water-supply pipe connected with the storage-vessel to supply a head of water for more thoroughly equalizing pressure and providing escape for surplus air, substantially as described.

9. A gas-engine having, in combination with air-vessel $b$, the cock $j$, pipe $j'$, stop-valve $j^2$, and perforated pipe $j^3$ for continuing the blast for the ignition apparatus by using a small portion of gases from the working cylinder.

10. A gas-engine having, in combination, the pipe and valve $w$, receiving-vessel $w'$, return-pipe $w^2$, and outlet-pipe $w^3$ for ventilating the crank-chamber and returning any escaping lubricant to the crank-chamber.

11. A gas-engine having an ignition apparatus in which is a reel-shaped plug or fitting $m$, with outer annular gas and air passage fitted within the cylinder-walls and having a seat for the fitted mouth of the ignition-tube or capsule, and conveying-passages for playing the mixed gas and air on the part of the ignition-tube nearest to the cylinder, combined with refractory lining and wire-gauze $m^4$ for preventing the flame reaching the annular passage $m^2$.

12. In a gas-engine, the combination of the cylinder, the piston, the crank-pin, the connecting-rod, and an intermediate shaft extending along the connecting-rod and in rotative connection with both the piston and crank-pin, substantially as described.

HENRY THOMAS DAWSON.

Witnesses:
GEO. B. WOODRUFF,
24 *Second Avenue, Brighton, England.*
STANLEY WOOD,
63 *Ship Street, Brighton, England, Solicitor's Clerk.*